United States Patent
Chien et al.

(10) Patent No.: US 10,606,352 B2
(45) Date of Patent: Mar. 31, 2020

(54) DUAL MODE EYE TRACKING METHOD AND SYSTEM

(71) Applicant: National Taiwan University, Taipei (TW)

(72) Inventors: Shao-Yi Chien, Taipei (TW); Yi-Heng Wu, Taipei (TW); Po-Jung Chiu, Taipei (TW); Liang Fang, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 16/162,219

(22) Filed: Oct. 16, 2018

(65) Prior Publication Data

US 2019/0227622 A1    Jul. 25, 2019

(30) Foreign Application Priority Data

Jan. 22, 2018    (TW) .............................. 107102156 A

(51) Int. Cl.
*G09G 5/00* (2006.01)
*G06F 3/01* (2006.01)
*G02B 27/01* (2006.01)

(52) U.S. Cl.
CPC .......... *G06F 3/013* (2013.01); *G02B 27/017* (2013.01); *G02B 27/0172* (2013.01); *G02B 27/0179* (2013.01); *G02B 2027/014* (2013.01); *G02B 2027/0187* (2013.01)

(58) Field of Classification Search
CPC ...... G06F 3/013; G06F 3/0482; G06F 1/3206; G06F 1/163; G06F 3/011; G06F 3/0304; G06F 3/012; A61B 3/113; A61B 3/14; A61B 5/6803; A61B 3/10; G06T 19/006; G06T 2207/10152; G06T 2207/30244; A61F 2007/0004; A61F 2009/00863; A61F 9/0026; A61F 2007/004; A61F 9/008; A61F 2009/00842; A61F 2009/00851; A61F 2009/0087; A61F 2009/00872; A61F 2009/00897; A61F 2/141; A61F 9/0017; A61F 9/00727; A61F 9/0079; A61F 9/00827; A61F 9/00829; A61F 9/0082
USPC .......................................................... 345/7–9
See application file for complete search history.

(56) References Cited

U.S. PATENT DOCUMENTS 8,971,570 B1 * 3/2015 Raffle ................ G06K 9/00604
                                                            382/103
2016/0363995 A1 * 12/2016 Rougeaux ................. G06T 7/73

* cited by examiner

*Primary Examiner* — Duc Q Dinh
(74) *Attorney, Agent, or Firm* — Stout, Uxa & Buyan, LLP; Donald E. Stout

(57) ABSTRACT

In a dual mode eye tracking method and system, an infrared (IR) ray is emitted to perform an IR tracking mode and visible light (VL) calibration. When a first error between a VL associated gaze position and an IR associated gaze position is less than a first threshold, the IR ray is turned off to perform a VL tracking mode. In a VL checking period, when a second error between a VL associated gaze position and an IR associated gaze position is less than a second threshold, the IR ray is turned off to continue the VL tracking mode.

22 Claims, 5 Drawing Sheets

DUAL MODE EYE TRACKING METHOD AND SYSTEM

CROSS-REFERENCE TO RELATED APPLICATIONS

This application claims priority to Taiwan Patent Application No. 107102156, filed on Jan. 22, 2018, the entire contents of which are herein expressly incorporated by reference.

BACKGROUND OF THE INVENTION

1. Field of the Invention

The present invention generally relates to eye tracking, and more particularly to a dual mode eye tracking system and method.

2. Description of Related Art

Eye tracking is a technique of measuring gaze position of eyes by using sensors. Eye tracking devices (or eye trackers) may be classified into remote type and mobile type according to their configuration. As distance between a remote eye tracking device and eyes is at least tens of centimeters, the remote eye tracking device possesses low accuracy. A mobile eye tracking device is disposed near eyes (e.g., disposed at glasses) and thus has high accuracy. There are limits on usage time (e.g., a couple of hours) of the eye tracking device as power source needs be continuously turned on while performing tracking.

The eye tracking device may be adaptable to a variety of applications such as healthcare for preventing dry eye syndrome by detecting eye blinking. The eye tracking device may be adaptable to driving safety for preventing fatigue driving by analyzing driving concentration. The eye tracking device may be adaptable to virtual reality (VR) or augmented reality (AR) for achieving better performance by collecting auxiliary information.

Conventional eye tracking devices use one or more near-infrared light sources for capturing and analyzing infrared (IR) images to obtain gaze position of eyes. However, IR system causes erroneous judgment in outdoor with strong sunshine, thus reducing tracking accuracy. Therefore, conventional eye tracking devices are suitable for indoor applications.

More importantly, the IR light source of the mobile eye tracking device is near the eyes, which is exposed to IR light. Users ordinarily worry about injury to the eyes caused by IR light, and therefore users have no inclination to wear the mobile eye tracking device.

A need has thus arisen to propose a novel eye tracking scheme for reducing power consumption to lengthen usage time and for reducing the amount of IR light irradiating the eyes.

SUMMARY OF THE INVENTION

In view of the foregoing, it is an object of the embodiment of the present invention to provide a dual mode eye tracking system and method capable of switching between an infrared (IR) tracking mode and a visual light (VL) tracking mode. The light source of the embodiment is primarily natural light but secondarily IR light, thereby effectively reducing power consumption to lengthen usage time, and preventing eyes from being exposed to IR ray and reducing worry about injury to the eyes.

According to one embodiment, a dual mode eye tracking method includes the following steps. An infrared (IR) ray is emitted to perform the IR tracking mode to obtain a first gaze position and to perform visual light (VL) tracking to obtain a second gaze position. Determine a first error between the second gaze position and the first gaze position. Turn off the IR ray to perform the VL tracking mode when the first error is less than a first threshold. In a VL checking period, the IR ray is emitted and a second error between the second gaze position and the first gaze position is determined. Turn off the IR ray to continue the VL tracking mode when the second error is less than a second threshold.

According to another embodiment, a dual mode eye tracking system includes an infrared (IR) illuminator, an image sensing device and a controller. The illuminator emits an IR ray to eyes. The image sensing device receives an input image and converts the input image to an electrical signal, the input image including an IR image and a visual light (VL) image, and the image sensing device operating in VL range and IR range. The controller controls the IR illuminator in order to turn on or off the IR illuminator. The controller controls the image sensing device in order to generate a corresponding VL electrical signal according to the VL image, or generate a corresponding IR electrical signal according to the IR image, or generate both at the same time.

DETAILED DESCRIPTION OF THE INVENTION

Figure 1:
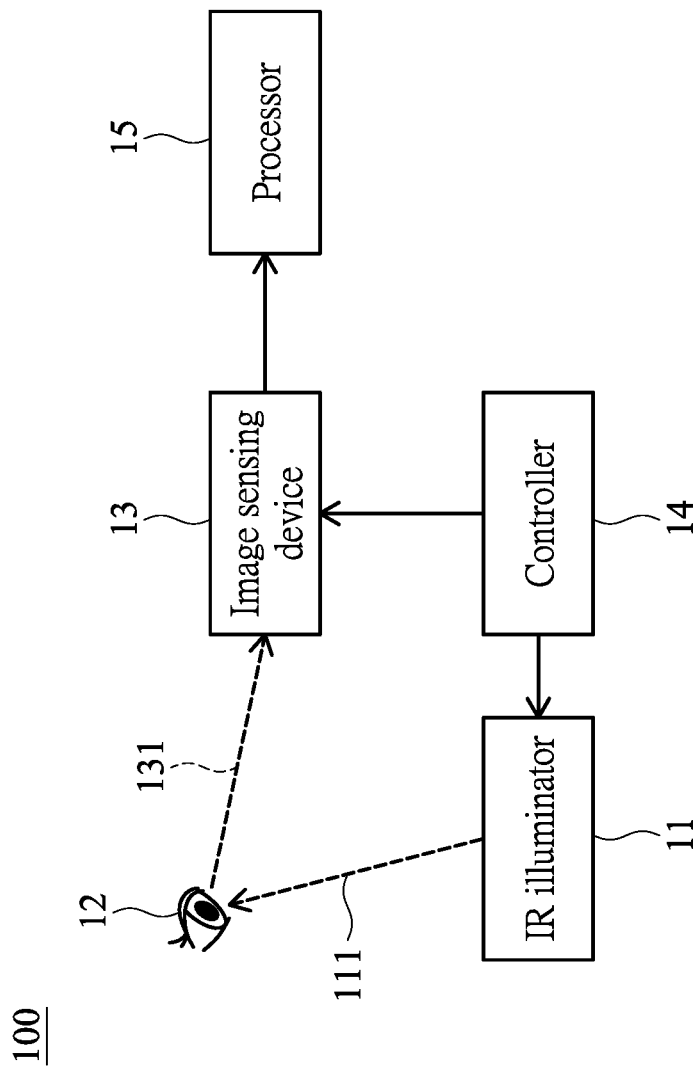
FIG. 1 shows a system block diagram illustrating a dual mode eye tracking system according to one embodiment of the present invention.

FIG. 1 shows a system block diagram illustrating a dual mode eye tracking system 100 adaptable to obtaining a gaze position of eyes according to one embodiment of the present invention. In the embodiment, the dual mode eye tracking system (tracking system hereinafter) 100 may include an infrared (IR) illuminator 11 configured to emit an IR ray 111 to eyes 12. The IR illuminator 11 may be composed of one or more IR light sources. The IR ray 111 schematically shown in FIG. 1 needs not to represent a real light path. The IR ray 111 emitted by the IR illuminator 11 of the embodiment may be in near-infrared range (e.g., 0.75-1.4 micrometer in wavelength) or other region of infrared (e.g., 0.7-1000 micrometers in wavelength).

The tracking system 100 of the embodiment may include an image sensing device 13 (e.g., a camera) configured to receive an input image 131 and convert it to an electrical signal. The image sensing device 13 may be composed of one or more image sensors. According to one aspect of the embodiment, the image sensing device 13 may operate in visual light (VL) range (e.g., 0.4-0.7 micrometer in wavelength) and IR range (e.g., near-infrared). Alternatively speaking, the input image 131 received by the image sensing device 13 may include an IR image that is produced by reflecting and/or refracting the IR ray 111 (emitted by the IR illuminator 11) via the eyes 12; or a VL image that is produced by reflecting and/or refracting an ambient natural light ray via the eyes 12.

Figure 2:
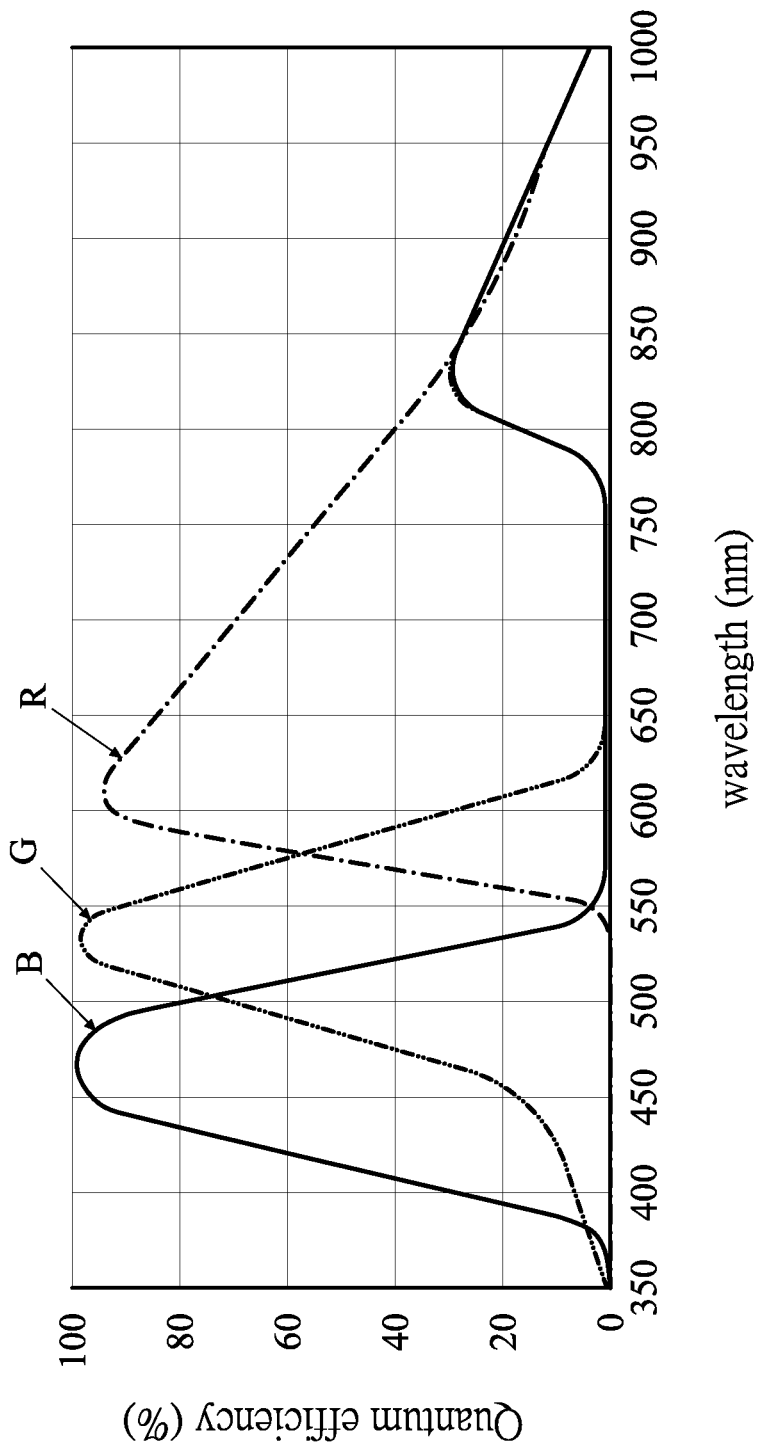
FIG. 2 shows exemplary spectral sensitivity of the image sensing device of FIG. 1.

FIG. 2 shows exemplary spectral sensitivity (e.g., quantum efficiency versus wavelength) of the image sensing device 13 of FIG. 1 including VL range (e.g., red light (R), green light (G) and blue light (B)) and IR range (e.g., near-infrared). In one example, the image sensing device 13 may include one image sensor that covers both the VL range (e.g., red light, green light and blue light) and infrared range. In another example, the image sensing device 13 is composed of a VL image sensor and an IR image sensor.

In the embodiment, the tracking system 100 may include a controller 14 configured to control the IR illuminator 11 in order to turn on or off the IR illuminator 11. Moreover, the controller 14 may control the image sensing device 13 in order to generate a corresponding VL electrical signal according to a VL image of input image 131, or generate a corresponding IR electrical signal according to an IR image of the input image 131, or generate both at the same time.

The tracking system 100 of the embodiment may include a processor 15 (e.g., an image processor) configured to receive the electrical signal generated by the image sensing device 13, according to which the gaze position of the eyes 12 may be obtained. It is appreciated that the controller 14 and the processor 15 may, but not necessarily, be manufactured in the same circuit or chip.

Figure 3:
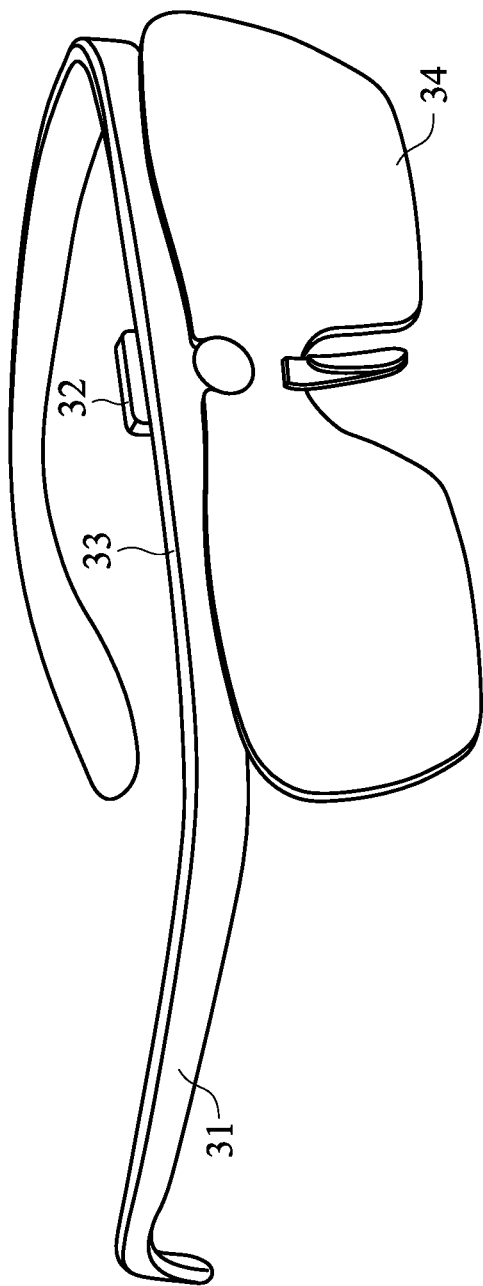
FIG. 3 shows a perspective view of exemplary smart glasses.

The tracking system 100 of the embodiment may be adaptable to remote applications, in which, for example, distance between the tracking system 100 and eyes is 0.5 meter. The tracking system 100 of the embodiment may be adaptable to mobile or near-eyes applications such as wearable computer glasses or smart glasses. FIG. 3 shows a perspective view of exemplary smart glasses. The controller 14, the processor 15, the image sensing device 13 and the IR illuminator 11 may be disposed at suitable positions, respectively. For example, the controller 14 and the processor 15 may be disposed in a box 32 connected to a leg 31 or a frame 33. The image sensing device 13 may be disposed in the box 32, at lens 34 or at the frame 33. The IR illuminator 11 may be disposed at the frame 33 or at lens 34. In one example, an image sensing device 13 disposed at one lens 34 is used to sense a VL image, and an image sensing device 13 disposed at another lens 34 is used to sense an IR image.

Figure 4:
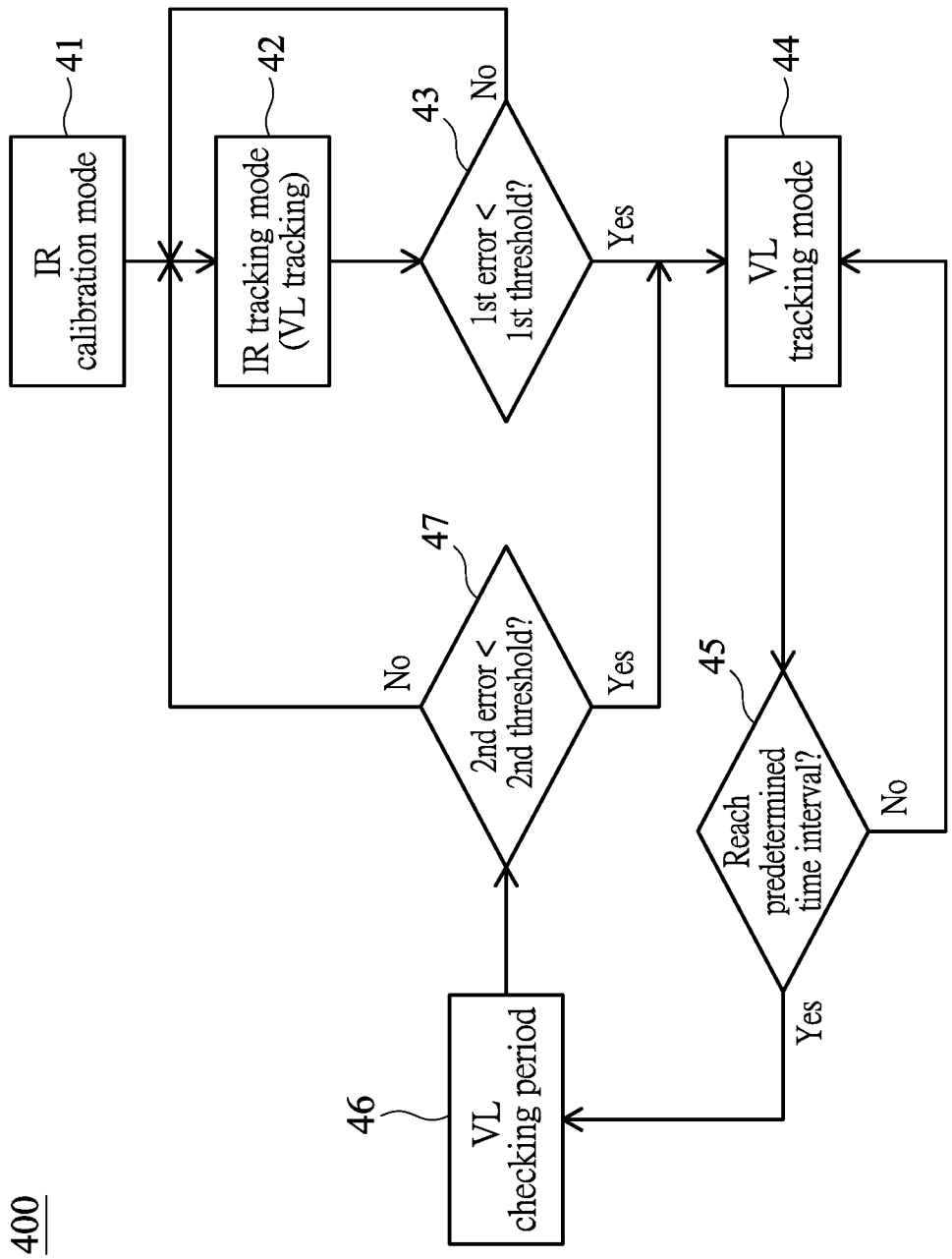
FIG. 4 shows a flow diagram illustrating a dual mode eye tracking method according to one embodiment of the present invention.

FIG. 4 shows a flow diagram illustrating a dual mode eye tracking method 400 according to one embodiment of the present invention. The dual mode eye tracking method (tracking method hereinafter) 400 may be adaptable to remote applications or mobile applications (e.g., smart glasses). The details of the tracking method 400 of the embodiment will be described below with reference to the tracking system 100 of FIG. 1.

In step 41, an IR calibration mode is performed. The controller 14 turns on the IR illuminator 11 to emit an IR ray 111 to eyes 12. Further, the controller 14 controls the image sensing device 13 in order to generate a corresponding IR electrical signal according to an IR image of the input image 131. The generated IR electrical signal is processed by the processor 15 to obtain a gaze position of the eyes 12. In an IR calibration example such as the smart glasses shown in FIG. 3, a (still or dynamic) predetermined pattern is displayed and viewed by a user, and the gaze position (processed by the processor 15) is then compared with the position of the predetermined pattern for consistency. If difference therebetween after comparison exceeds a predetermined tolerance range, the tracking system 100 may execute automatic or manual adjustment until the difference lies within the predetermined tolerance range. Accordingly, in the IR calibration mode (step 41), the IR illuminator 11 is turned on, and the image sensing device 13 senses only the IR image of the input image 131 to generate the corresponding IR electrical signal.

When the IR calibration is complete, the flow goes to step 42 to perform an IR tracking mode, in which the IR illuminator 11 emits an IR ray 111 to the eyes 12, and the image sensing device 13 senses the IR image of the input image 131 to generate the corresponding IR electrical signal. The IR electrical signal is then processed by the processor 15 to obtain a first gaze position of the eyes 12.

According to one aspect of the embodiment, in the IR tracking mode, the controller 14 also controls the image sensing device 13 to sense a VL image of the input image 131 to perform VL tracking, thus generating a corresponding VL electrical signal. The generated VL electrical signal is then processed by the processor 15 to obtain a second gaze position of the eyes 12. Generally speaking, in an initial state, the first gaze position from the IR image is more accurate than the second gaze position from the VL image. However, when time elapses, the second gaze position becomes as accurate as the first gaze position. In the embodiment, when the processor 15 processes the VL electrical signal, extracted features of eye image by image processing technique along with auxiliary data obtained in the IR calibration mode (step 41) are operated under regression computation, thus inferring gaze position of the eyes.

In step 43, a (first) error of the second gaze position with respect to the first gaze position is computed (e.g., (positive-value) distance between the first gaze position and the second gaze position). When the (first) error is not less than a first threshold (indicating that VL learning has not been accomplished), the flow goes back to the IR tracking mode (step 42) to continue VL learning. When the (first) error is less than the first threshold (indicating that the second gaze position is very close to the first gaze position), the flow goes to step 44 to perform VL tacking mode. Accordingly, in the IR tracking mode (step 42), VL tracking (or learning) is performed in addition to the IR eye tracking. As mentioned above, the second gaze position from the VL image will become more accurate through learning. It is appreciated that the first threshold may be a fixed value or may be dynamically adjusted.

When the second gaze position becomes accurate enough (i.e., the error is less than the first threshold), the flow goes to a VL tracking mode (step 44). In the VL tracking mode, the controller 14 turns off the IR illuminator 11, which no longer emits the IR ray 111. Instead, a VL image produced by reflecting and/or refracting an ambient natural light ray via the eyes 12 is used as the input image 131 and fed to the image sensing device 13, thus generating a corresponding VL electrical signal. The generated VL electrical signal is then processed by the processor 15 to obtain the second gaze position of the eyes 12. Accordingly, as the IR illuminator 11 is turned off in the VL tracking mode, only the natural light is used without additional light source, thereby substantially reducing power consumption. As the mobile tracking device (e.g., smart glasses) has limited power, decrease in power consumption hence considerably lengthening the usage time. Moreover, no IR ray 111 is emitted in the VL tracking mode, thus preventing eyes from being exposed to IR ray and reducing worry about injury to the eyes.

In order to prevent the second gaze position obtained through the VL image from drifting and becoming inaccurate in the VL tracking mode (step 44), the flow goes to step 46 (i.e., VL checking period) to check whether the second gaze position drifts, when a predetermined condition (step 45) is met. In the embodiment, step 45 determines whether a predetermined time interval (e.g., 10 seconds) is reached, for example, by using a timer. When the timer has not reached the predetermined time interval, the VL tracking mode (step 44) continues; when the timer has reached the predetermined time interval, the flow goes to step 46. In another example, the mechanism of step 45 can be adjusted according to environmental sensing result. In a further example, the mechanism of step 45 can be adjusted according to machine learning result of visual light.

In the VL checking period (step 46), the controller 14 turns on the IR illuminator 11 to emit an IR ray 111 to the eyes 12 for a predetermined period, and the image sensing device 13 senses an IR image of the input image 131 to generate a corresponding IR electrical signal. The IR electrical signal is then processed by the processor 15, thus obtaining a first gaze position of the eyes 12. Step 46 is similar to step 42, in which the IR illuminator 11 is turned on and both the IR image and the VL image of the input image 131 are sensed. However, step 46 is performed in a shorter period to check accuracy of the second gaze position, while step 42 is performed in a longer period to execute VL tracking (or learning).

Next, in step 47, a (second) error of the second gaze position with respect to the first gaze position is computed. When the (second) error is less than a second threshold (indicating that the second gaze position remains accurate), the flow goes back to the VL tracking mode (step 44). When the (second) error is not less than the second threshold (indicating that the second gaze position drifts and is no longer accurate), the flow goes back to step 42 (i.e., IR tracking mode) to execute VL learning (or calibration). It is appreciated that the second threshold may be a fixed value or may be dynamically adjusted.

Figure 5:
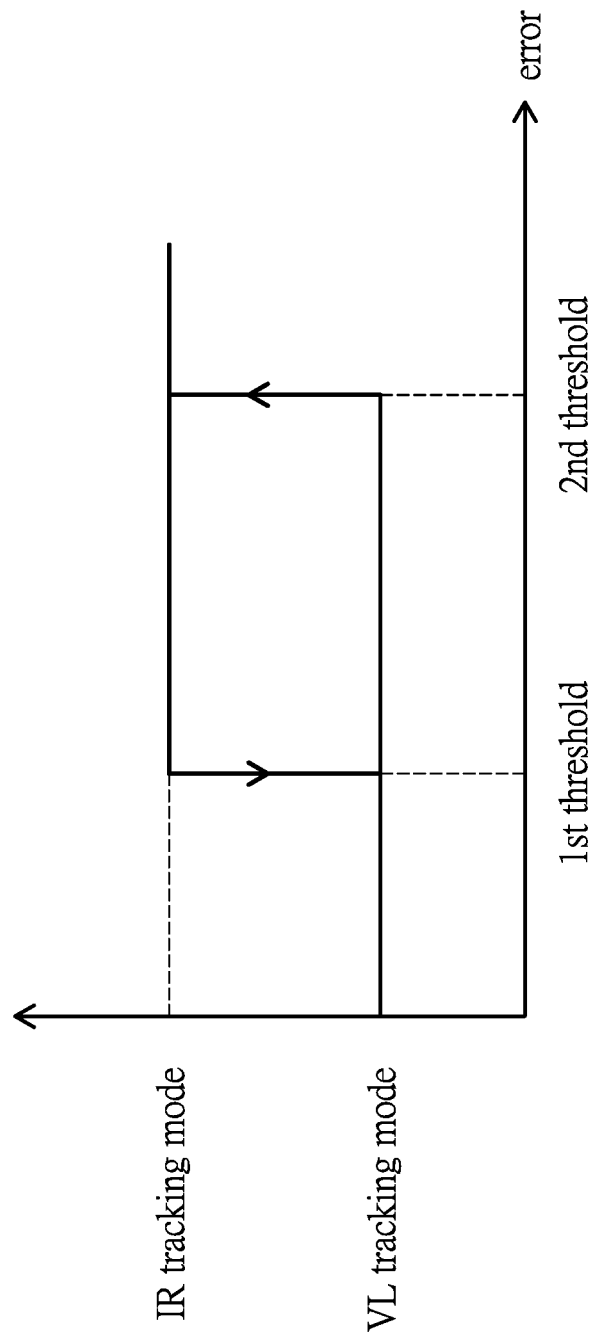
FIG. 5 shows a curve illustrating the IR tracking mode and the VL tracking mode with respect to errors.

In the specification, the first threshold and the second threshold are positive values, which may be the same or different. In the embodiment, the first threshold is less than the second threshold. FIG. 5 shows a curve illustrating the IR tracking mode and the VL tracking mode with respect to errors. As shown in the figure, the switching between the IR tracking mode and the VL tracking mode possesses hysteresis or memory effect capable of preventing unwanted rapid and repetitive switching.

Accordingly, the embodiment proposes a dual mode eye tracking system and method, which turn on the IR illuminator 11 initially in the IR calibration mode (step 41) and the IR tracking mode (step 42). When VL learning (step 42) is accomplished, the IR illuminator 11 is turned off. Thereafter, the IR illuminator 11 is turned off most of the time. Alternatively speaking, the embodiment proposes an eye tracking system or method, in which the natural light is primary while the IR light is secondary. Accordingly, the embodiment is capable of substantially reducing power consumption and the amount of IR light irradiating the eyes, thus reducing worry about injury to the eyes. The embodiment is particularly adaptable to situations with sufficient lighting, in which the VL tracking mode (step 44) dominates most of the time, therefore considerably lengthening the usage time. In general, a period of the IR tracking mode (step 42) is shorter than a period of the VL tracking mode (step 44).

Although specific embodiments have been illustrated and described, it will be appreciated by those skilled in the art that various modifications may be made without departing from the scope of the present invention, which is intended to be limited solely by the appended claims.

What is claimed is:

1. A dual mode eye tracking method, comprising:
   emitting an infrared (IR) ray to perform an IR tracking mode to obtain a first gaze position and to perform visual light (VL) tracking to obtain a second gaze position;
   determining a first error between the second gaze position and the first gaze position;
   turning off the IR ray to perform a VL tracking mode when the first error is less than a first threshold;
   entering a VL checking period to emit the IR ray and determine a second error between the second gaze position and the first gaze position; and
   turning off the IR ray to continue the VL tracking mode when the second error is less than a second threshold.

2. The method of claim 1, wherein the IR tracking mode continues when the first error is not less than the first threshold.

3. The method of claim 1, wherein the IR tracking mode is recovered when the second error is not less than the second threshold.

4. The method of claim 1, wherein the first threshold is less than the second threshold.

5. The method of claim 1, further comprising a step of performing IR calibration before performing the IR tracking mode.

6. The method of claim 5, wherein the step of performing IR calibration comprises:
   displaying a predetermined pattern for eyes;
   comparing a gaze position with a position of the predetermined pattern for consistency; and
   if difference between the gaze position and the position of the predetermined pattern exceed a predetermined tolerance range, executing adjustment until the difference lies within the predetermined tolerance range.

7. The method of claim 5, wherein the VL tracking comprises:
   extracting features of eye image by image processing technique; and
   operating the extracted features along with auxiliary data obtained in the IR calibration under regression computation, thus inferring gaze position of eyes.

8. The method of claim 1, wherein the VL checking period is shorter than a period of the IR tracking mode.

9. The method of claim 1, wherein a period of the IR tracking mode is shorter than a period of the VL tracking mode.

10. The method of claim 1, before the VL checking period, further comprising a step of determining whether a predetermined condition is met, and entering the VL checking period when the predetermined condition is met, otherwise continuing the VL tracking mode.

11. The method of claim 10, wherein the predetermined condition is a predetermined time interval, environmental sensing result or machine learning result of visual light.

12. A dual mode eye tracking system, comprising:
   an infrared (IR) illuminator that emits an IR ray to eyes;
   an image sensing device that receives an input image and converts the input image to an electrical signal, the input image including an IR image and a visual light (VL) image, and the image sensing device operating in VL range and IR range; and
   a controller that controls the IR illuminator in order to turn on or off the IR illuminator;
   wherein the controller controls the image sensing device in order to generate a corresponding VL electrical signal according to the VL image, or generate a corresponding IR electrical signal according to the IR image, or generate both at the same time; and wherein the IR illuminator emits the IR ray to perform an IR tracking mode to obtain a first gaze position and to perform VL tracking to obtain a second gaze position, and the controller turns off the IR ray to perform a VL tracking mode when an error between the second gaze position and the first gaze position is less than a threshold.

13. The system of claim 12, further comprising a processor that receives the electrical signal converted by the image sensing device, according to which a gaze position of the eyes is obtained.

14. The system of claim 13, further comprising wearable computer glasses, at which the IR illuminator, the image sensing device, the controller and the processor are disposed.

15. The system of claim 14, wherein one image sensor of the image sensing device disposed at one lens of the wearable computer glasses senses the VL image, and another image sensor of the image sensing device disposed at another lens of the wearable computer glasses senses the IR image.

16. The system of claim 12, in the IR tracking mode, the controller turns on the IR illuminator and controls the image sensing device to sense the IR image, thereby generating the corresponding IR electrical signal, and the controller controls the image sensing device to sense the VL image, thereby generating the corresponding VL electrical signal.

17. The system of claim 12, in the VL tracking mode, the controller turns off the IR illuminator and controls the image sensing device to sense the VL image, thereby generating the corresponding VL electrical signal.

18. The system of claim 12, wherein a period of the IR tracking mode is shorter than a period of the VL tracking mode.

19. The system of claim 12, wherein the IR illuminator comprises one or more IR light sources.

20. The system of claim 12, wherein the image sensing device comprises one or more image sensors.

21. The system of claim 12, wherein the image sensing device comprises one image sensor that covers both visual light range and infrared range.

22. The system of claim 12, wherein the image sensing device comprises a VL image sensor and an IR image sensor.

* * * * *